United States Patent
Reischmann et al.

(10) Patent No.: US 12,108,512 B2
(45) Date of Patent: Oct. 1, 2024

(54) COOKTOP MAT WITH CONTROL WINDOW

(71) Applicant: Kenyon International, Inc., Clinton, CT (US)

(72) Inventors: Michael Reischmann, Eustis, FL (US); Phillip Williams, Clinton, CT (US)

(73) Assignee: Kenyon International, Inc., Clinton, CT (US)

( * ) Notice: Subject to any disclaimer, the term of this patent is extended or adjusted under 35 U.S.C. 154(b) by 34 days.

(21) Appl. No.: 16/813,132

(22) Filed: Mar. 9, 2020

(65) Prior Publication Data

US 2020/0389948 A1    Dec. 10, 2020

Related U.S. Application Data

(60) Provisional application No. 62/858,104, filed on Jun. 6, 2019.

(51) Int. Cl.
  *B32B 25/20*    (2006.01)
  *B32B 7/12*    (2006.01)
  (Continued)

(52) U.S. Cl.
  CPC .............. *H05B 6/1209* (2013.01); *B32B 7/12* (2013.01); *B32B 25/20* (2013.01); *B32B 37/12* (2013.01);
  (Continued)

(58) Field of Classification Search
  CPC ........................ H05B 6/1209; H05B 2206/023; H05B 6/106; B32B 37/12; B32B 25/20;
  (Continued)

(56) References Cited

U.S. PATENT DOCUMENTS 1,992,515 A    2/1935    Uhimann
2,012,981 A    9/1935    Wilsey
(Continued)

FOREIGN PATENT DOCUMENTS

CA    2922560 A1 *    8/2017
DE    3810253 A1    10/1988
(Continued)

OTHER PUBLICATIONS

Translucent _ Definition of Translucent by Merriam-Webster (Year: 2009).*
(Continued)

*Primary Examiner* — Helena Kosanovic
*Assistant Examiner* — Tiffany T Tran
(74) *Attorney, Agent, or Firm* — Farber LLC; Jonathan Winter

(57) ABSTRACT

A pad with a fiber reinforced silicone rubber material wherein the fiber reinforcement is of a weight of at least 100 grams per square meter, the pad having a thickness over a majority of the pad's surface area which between 0.5 and 4 millimeters thick wherein the pad is flexible and impervious to fluid and has sufficient surface tack to inhibit objects from sliding off the pad. The pad does not include metallic materials. The pad is manufactured by: providing a fiber reinforcement sheet and applying silicone to said fiber reinforcement sheet; curing the fiber reinforcement sheet with applied silicone to create a fiber reinforced silicone sheet which is impervious to fluid; cutting said fiber reinforced silicone sheet in a rectilinear pattern sized based on known cooktop dimensions; printing said fiber reinforced silicone sheet with an ink of a first color.

10 Claims, 5 Drawing Sheets

(51) Int. Cl.
*B32B 37/12* (2006.01)
*B32B 38/00* (2006.01)
*F24C 15/36* (2006.01)
*H05B 6/12* (2006.01)

(52) U.S. Cl.
CPC ........ *B32B 38/0004* (2013.01); *B32B 38/145* (2013.01); *F24C 15/36* (2013.01); *B32B 2037/1253* (2013.01); *B32B 2250/02* (2013.01); *B32B 2262/101* (2013.01); *B32B 2307/7265* (2013.01)

(58) Field of Classification Search
CPC ..... B32B 38/145; B32B 38/0004; B32B 7/12; B32B 2262/101; B32B 2307/7265; B32B 2250/02; B32B 2037/1253; B32B 2260/021; B32B 2264/10; B32B 2413/00; B32B 25/08; B32B 27/20; B32B 27/281; B32B 27/322; F24C 15/36; F24C 15/12; A21B 3/15; A21B 1/48; A21B 5/02; B29C 39/148; B29C 39/18; B29C 59/046; B29C 70/50; B29D 29/06
USPC ........... 219/620, 634, 653; 99/422; 442/289, 442/286, 301; 428/421; 524/546, 588; 427/331, 402; 29/460, 428, 588; 474/251, 265, 266
See application file for complete search history.

(56) References Cited

U.S. PATENT DOCUMENTS

| | | | |
|---|---|---|---|
| 2,582,449 A | 1/1952 | Millar | |
| 3,231,718 A | 1/1966 | Vasile | |
| 3,612,828 A | 10/1971 | Siegla | |
| 3,624,352 A | 11/1971 | Deaton et al. | |
| 3,636,309 A | 1/1972 | Deaton et al. | |
| 3,646,321 A | 2/1972 | Siegla | |
| 3,679,870 A | 7/1972 | Opp | |
| 3,691,892 A | 9/1972 | Matsuura et al. | |
| 3,715,550 A | 2/1973 | Harnden, Jr. et al. | |
| 3,733,462 A | 5/1973 | Bouchard et al. | |
| 3,734,077 A | 5/1973 | Murdough et al. | |
| 3,742,179 A | 6/1973 | Harnden, Jr. | |
| 3,767,506 A | 10/1973 | Kawakami | |
| 3,777,094 A | 12/1973 | Peters, Jr. | |
| 3,786,220 A | 1/1974 | Harnden, Jr | |
| 3,836,744 A | 9/1974 | Taketo et al. | |
| 3,898,410 A | 8/1975 | Peters, Jr. | |
| 3,974,358 A | 8/1976 | Goltsos | |
| 4,110,587 A | 8/1978 | Sounder, Jr. et al. | |
| 4,151,387 A | 4/1979 | Peters, Jr. | |
| 4,158,979 A | 6/1979 | Suzuki | |
| 4,348,571 A | 9/1982 | Dills | |
| 4,447,710 A | 5/1984 | McWilliams | |
| 4,508,961 A | 4/1985 | McWilliams | |
| 4,517,446 A | 5/1985 | Torning | |
| 4,704,939 A | 11/1987 | Straubinger | |
| 4,790,292 A | 12/1988 | Kuhn | |
| 4,910,372 A | 3/1990 | Vukich | |
| 4,914,717 A | 4/1990 | Gibbon | |
| 4,967,632 A | 11/1990 | Etheredge, III et al. | |
| 5,183,954 A | 2/1993 | Wasser | |
| 5,183,996 A | 2/1993 | Hazan et al. | |
| 5,430,273 A | 7/1995 | Bogdanski et al. | |
| 5,448,038 A | 9/1995 | Kim | |
| 5,508,498 A | 4/1996 | Rheinish et al. | |
| 5,617,071 A | 4/1997 | Daughton | |
| 5,634,256 A | 6/1997 | Fritschi | |
| 5,640,947 A | 6/1997 | Shute | |
| 5,714,738 A | 2/1998 | Hauschulz et al. | |
| 5,799,705 A | 9/1998 | Friedrich et al. | |
| 5,954,984 A | 9/1999 | Ablah et al. | |
| 5,958,272 A | 9/1999 | Taplan et al. | |
| 5,973,303 A | 10/1999 | Kuse | |
| 6,028,256 A | 2/2000 | Straubinger | |
| 6,121,591 A | 9/2000 | Eskildsen | |
| 6,188,047 B1 | 2/2001 | White et al. | |
| 6,225,541 B1 | 5/2001 | Kodera et al. | |
| 6,284,958 B1 | 9/2001 | Aoki et al. | |
| 6,305,023 B1 | 10/2001 | Barkes | |
| 6,310,329 B1 | 10/2001 | Carter | |
| 6,344,604 B1 | 2/2002 | Schmidt | |
| 6,414,271 B2 | 7/2002 | Yokoyama et al. | |
| 6,483,087 B2 | 11/2002 | Gardner et al. | |
| 6,657,170 B2 | 12/2003 | Clothier | |
| 6,664,455 B2 | 12/2003 | Aoki | |
| 6,840,167 B2 | 1/2005 | Clark et al. | |
| 6,972,361 B2 | 12/2005 | Shibamiya et al. | |
| 6,989,517 B2 | 1/2006 | Owens et al. | |
| 7,081,603 B2 | 7/2006 | Hoh et al. | |
| 7,173,224 B2 | 2/2007 | Kataoka et al. | |
| 7,459,621 B2 | 12/2008 | Straubinger | |
| 7,468,479 B2 | 12/2008 | Kraus | |
| 8,969,222 B2 * | 3/2015 | Keese | D06N 3/0077 442/180 |
| 10,064,246 B2 * | 8/2018 | Reischmann | H05B 6/1209 |
| 2002/0051695 A1 | 5/2002 | Friederich et al. | |
| 2002/0063124 A1 | 5/2002 | Clothier et al. | |
| 2002/0078942 A1 | 6/2002 | Hershey et al. | |
| 2003/0070282 A1 | 4/2003 | Hiatt et al. | |
| 2003/0070531 A1 | 4/2003 | Aoki | |
| 2003/0116560 A1 | 6/2003 | Wyatt | |
| 2003/0157343 A1 * | 8/2003 | Yeung | B29C 70/467 428/447 |
| 2004/0129128 A1 | 7/2004 | Shibamiya et al. | |
| 2004/0139860 A1 | 7/2004 | Hamm et al. | |
| 2005/0205561 A1 | 9/2005 | Keishima et al. | |
| 2006/0081615 A1 | 4/2006 | Kataoka et al. | |
| 2006/0102013 A1 * | 5/2006 | Spohn | A21B 3/15 99/422 |
| 2006/0169689 A1 * | 8/2006 | Carnevali | B63B 49/00 220/4.21 |
| 2006/0191908 A1 | 8/2006 | Park et al. | |
| 2006/0274493 A1 * | 12/2006 | Richardson | H05K 5/068 720/720 |
| 2007/0031602 A1 * | 2/2007 | Keese | A47J 36/02 427/331 |
| 2007/0039875 A1 | 2/2007 | Solomon-Winnemore et al. | |
| 2007/0082164 A1 | 4/2007 | Sellers | |
| 2007/0173595 A1 | 7/2007 | Tsuji et al. | |
| 2008/0028914 A1 | 2/2008 | Straubinger | |
| 2008/0124994 A1 * | 5/2008 | Spohn | B32B 27/281 442/289 |
| 2009/0095736 A1 | 4/2009 | Graber et al. | |
| 2009/0212391 A1 | 8/2009 | Carobolante et al. | |
| 2009/0289054 A1 | 11/2009 | Williams et al. | |
| 2010/0083948 A1 * | 4/2010 | Faraldi | B08B 17/04 126/39 M |
| 2010/0237064 A1 | 9/2010 | Liu et al. | |
| 2012/0043235 A1 * | 2/2012 | Klement | A45C 11/00 206/320 |
| 2012/0112859 A1 | 5/2012 | Park et al. | |
| 2012/0118874 A1 * | 5/2012 | Williams | H05B 6/1209 219/620 |
| 2013/0043231 A1 | 2/2013 | Won et al. | |
| 2015/0002924 A1 * | 1/2015 | Ono | B32B 7/12 359/350 |
| 2015/0382407 A1 * | 12/2015 | Reischmann | H05B 6/1209 219/622 |
| 2016/0073451 A1 * | 3/2016 | Reischmann | H05B 6/062 219/660 |
| 2016/0277053 A1 * | 9/2016 | Wong Chee | G06F 1/1669 |
| 2018/0251661 A1 * | 9/2018 | Uno | B32B 25/10 |
| 2018/0259188 A1 * | 9/2018 | Bach | F21V 5/04 |
| 2018/0282584 A1 * | 10/2018 | Mallya | B32B 27/34 |

(56) References Cited

U.S. PATENT DOCUMENTS

| 2018/0332671 A1 | 11/2018 | Reischmann et al. | |
| 2019/0032923 A1* | 1/2019 | Brown | F24C 15/00 |

FOREIGN PATENT DOCUMENTS

| DE | 202006014738 U1 | 12/2006 | |
| EP | 1489479 A1 | 12/2004 | |
| EP | 1492386 A1 | 12/2004 | |
| EP | 2546577 A1 * | 1/2013 | F24C 15/12 |
| GB | 2338778 A | 12/1999 | |
| JP | 1200589 A | 8/1989 | |
| JP | H05226069 A | 9/1993 | |
| JP | 2005174705 A | 6/2005 | |
| JP | 2005216844 A | 8/2005 | |
| JP | 2008166088 A | 7/2008 | |
| JP | 3174629 U | 3/2012 | |
| WO | 0205596 A1 | 1/2002 | |

OTHER PUBLICATIONS

Window _ Definition of Window by Merriam-Webster (Year: 2008).*
"Baking Mat, 28" × 20" Large Silicone Non-slip Baking Pastry Mat with Measurement, Non Stick Silicone Mats for Kitchen Counter, Fondant Mat, Counter Mat, Dough Rolling Mat, Oven Liner, Pie Crust Mat", 2022, Amazon.com (Year: 2022).*
Daorae Korean BBQ Restaurant—Korean BBQ in Desa Sri Hartamas; Retrieved from the internet on Jul. 27, 2011; http://feedmah.com/blog/daorae-korean-bbq-restaurant-korean-bbq-in-desa-sri-hartamas/; 5 pages.
European Search Report Application No. EP 09 75 1427 Completed: Nov. 2, 2013 8 pages.
TheInductionSite.com. "Induction Cooking: Useful Accessories" [Online Article] available since Feb. 22, 2010; Accessed Mar. 19, 2013; 7 pages.
International Search Report and Written Opinion of the International Searching Authority Application No. PCT/US2013/022470 Completed: Mar. 19, 2013; Mailing Date: Apr. 5, 2013 7 pages.
International Search Report and Written Opinion of the International Searching Authority; PCT/US09/44593; Jul. 21, 2009; 9 pages.
Korean Barbecue Dos and Don'ts—retrieved from the internet on Jul. 27, 2011; http://www.thefoodsection.com/foodsection/2005/4/korean_barbecue.html; 8 pages.
Certification Statement from Park IP Translations; Signed by: Abraham I. Holczer: Signature Date: Nov. 21, 2011; 1 page.
Translation of Unexamined Japanese Application Publication No. JP H01-200589; Published Aug. 11, 1989; Translation Issued Nov. 21, 2011; 11 pages. Translated by Park IP Translations.
Wikipedia, aluminum_Wiki.
Wikipedia, aluminum_Wiki-Revision-History.
International Search Report and Written Opinion; Application No. PCT/US2020/027046; Dated Jun. 16, 2020; 10 pages.

* cited by examiner

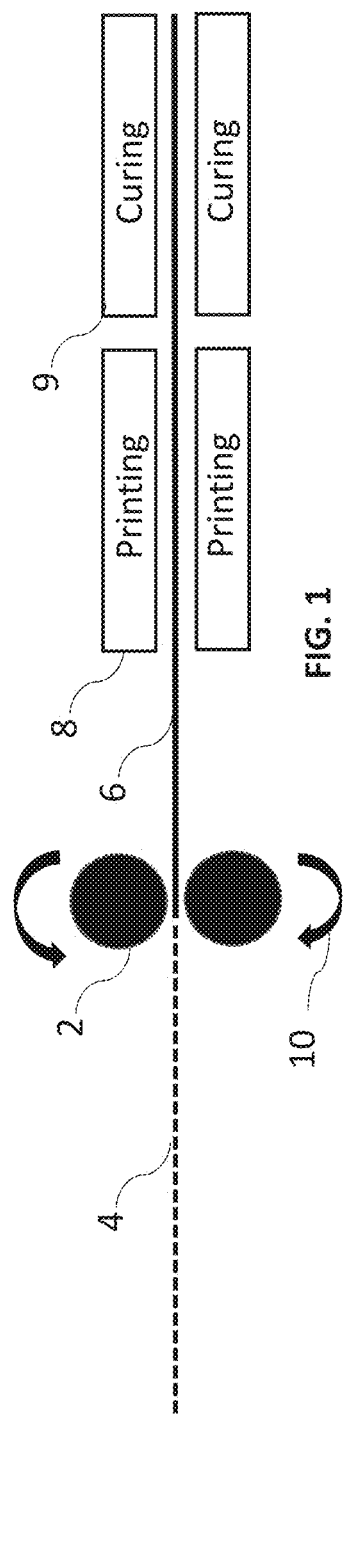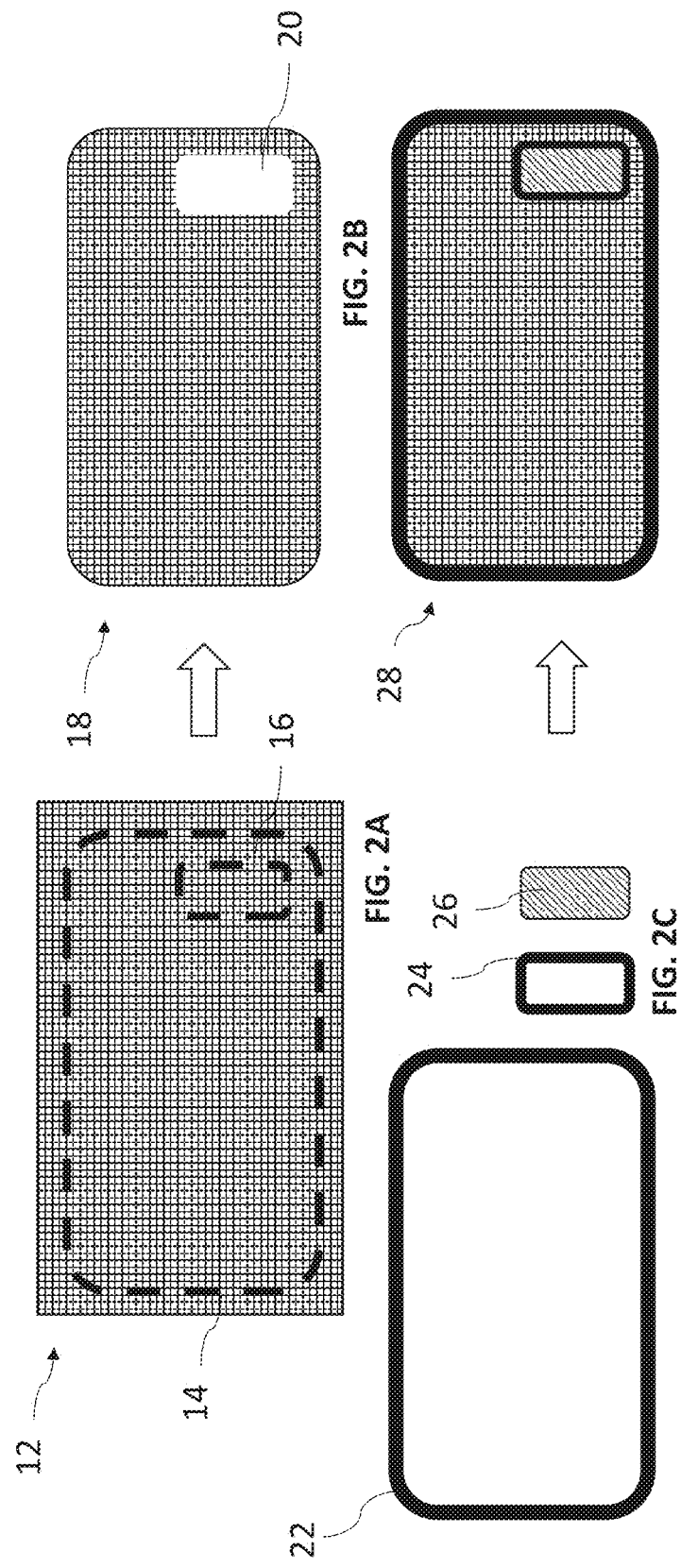

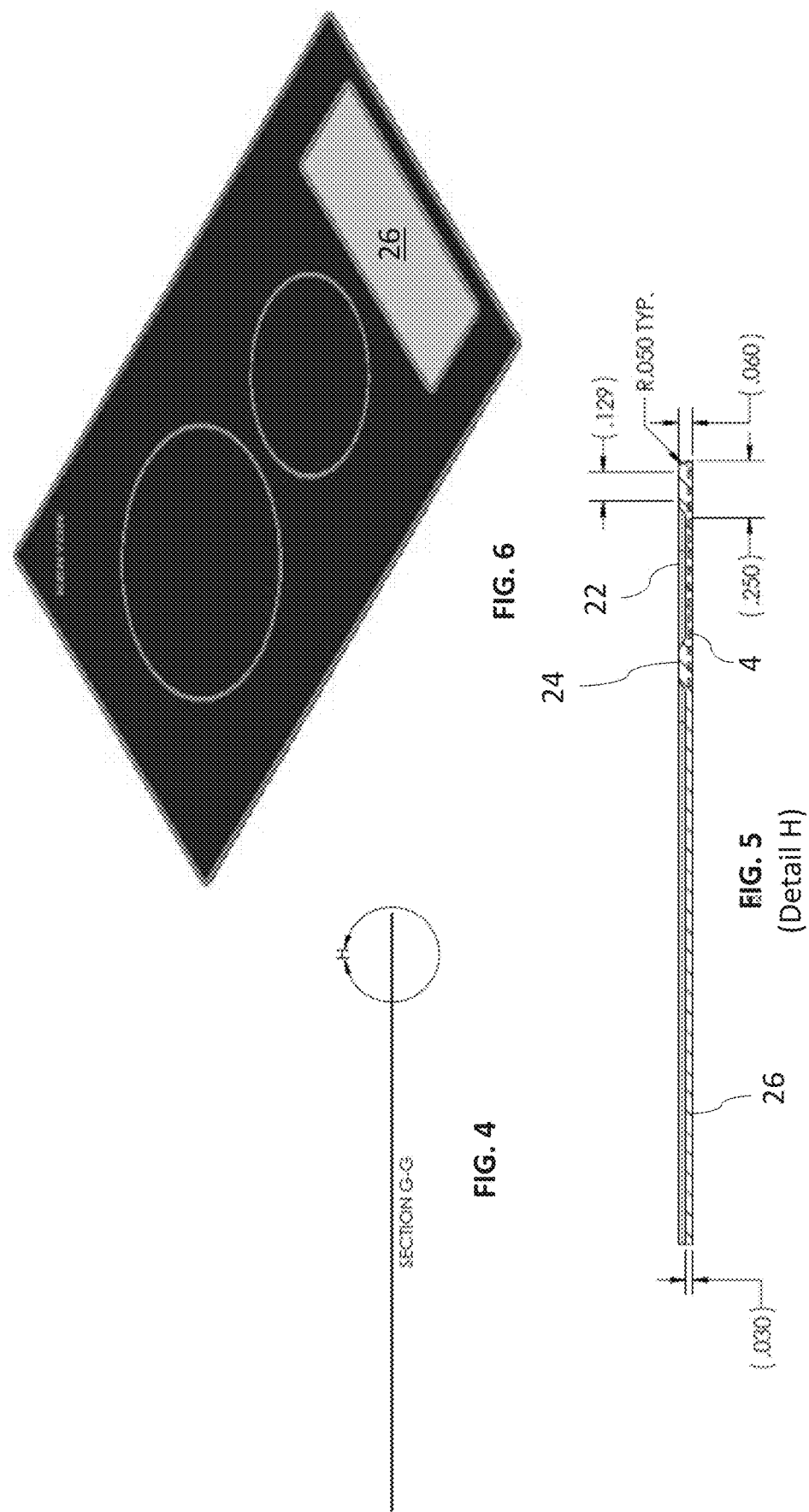

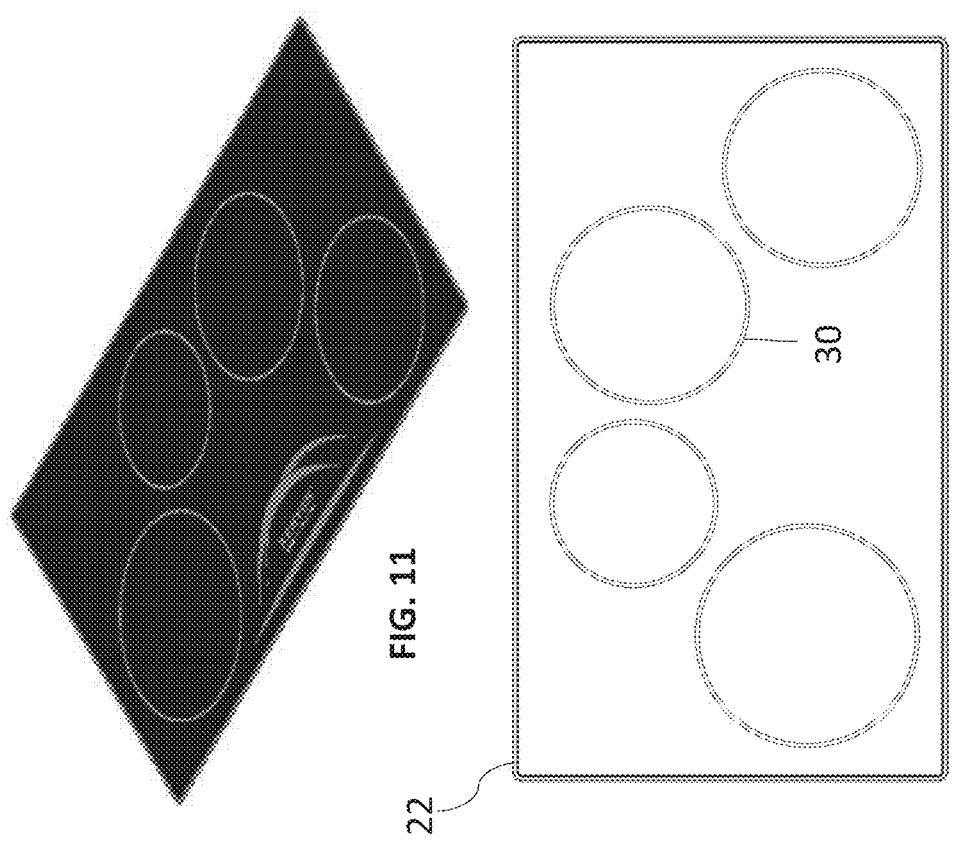
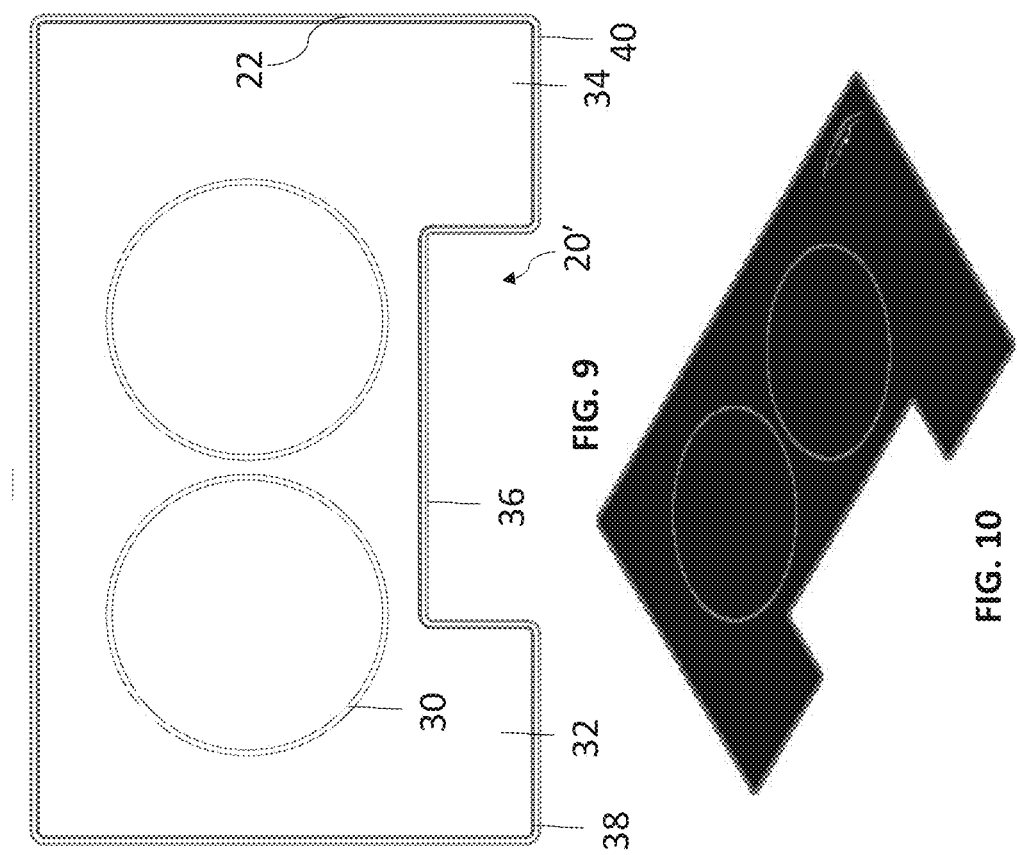
FIG. 9
FIG. 10
FIG. 11
FIG. 12

COOKTOP MAT WITH CONTROL WINDOW

FIELD OF THE INVENTION

The following relates to methods of protecting cooktops, specifically induction cooktops from damage and spills. More specifically, the following relates to a silicone pad reinforced with fibers (typically fiberglass) which is provided without metal components that can easily be removed from the cooktop and placed in e.g. the dishwasher for easy cleaning.

BACKGROUND OF THE INVENTION

Induction cooktops provide exceptionally good heating properties for cooking and provide a seamless and modern look in kitchens. Specifically, the glass cooktops provided between the induction coil and the stove have a pleasing visual appearance. The glass cooktops also make the stove easier to clean than a gas burner system that has a series of grates that need to be removed or traditional electric stove heat/resistance coils. The induction system provides heat through an oscillating magnetic field which will interact with a cooking vessel placed within the zone of the oscillating field. Typically a ferrous cooking vessel is desirable for optimal interaction with the induction coil(s) for generation of heat.

The glass cooktop provides a durable and visually appealing surface but has some downsides. Specifically, since the glass cooktop cannot be removed, it must be cleaned with a sponge or other cleaning products. Often, the glass will become hot and thus, the spill of sauce or whatever is being cooked can harden on the cooktop before the user can clean up the spill, thus making the spill more difficult to clean. Glass although tempered and durable is not indestructible and when cracked is expensive to replace.

The induction cooktops are also provided with a safety mechanism in that if the coil is allowed to run continuously, it could generate enough heat to deform or melt the pan. This can be dangerous and therefore, the safety mechanism includes a temperature sensor which can read the temperature of the pan (typically by inferring the temperature of the pan from the measured pan temperature).

Some solutions have been devised to work with induction stoves, for example, the present inventor's prior Pat. No. 10,064,246 (the content of which is incorporated by reference herein) provides a mat with a metal disc 303 that allows the sensor 305 to infer the pan's temperature. The silicone material used is relatively thick and provides insulating properties which may inhibit the glass cooktop surface from getting hot (or at least reduce the temperature). However, the metal disc 303 has been found to interact with the induction coil in a way that it reacts to the oscillating magnetic field such that the temperature sensor 305 has faulty measurements of the actual vessel temperature. In addition, it has been determined that in certain cases, the insulating material of the '246 patent, which may be silicone, can expand significantly when heated. In certain cases, when relatively lightweight cooking vessels are used without heavy food items in the vessel to be cooked that the silicone material can actually expand enough to lift the vessel off the cooktop. The thickness of the silicone material is also such that it provides insulating properties so that e.g. if the temperature sensor were to read the silicone material temperature to represent the vessel temperature that the insulating properties of the silicone would give erroneous readings.

SUMMARY OF THE INVENTION

It is therefore an object of the present invention to provide a protective mat for a cooktop which does not interact with the induction coil's magnetic field and which can be easily removed for cleaning.

It is further desirable to provide a protective mat which has a reduced tendency to expand due to temperature changes.

It is further an object of the invention to provide a pad which inhibits cooking vessels from sliding.

It is further an object of the invention to provide a pad which also covers touch sensitive controls but allows manipulation thereof through the pad.

It is further an object of the invention to provide a raised edge for the pad to keep spills trapped on the pad.

It is a further object of the invention to provide a method of manufacturing a pad to protect a cooktop which achieves the foregoing objects and advantages as disclosed herein.

These and other objects are achieved by providing a method of manufacturing a protective pad for a cooktop including one or more of the steps of: providing a fiber reinforcement sheet and applying silicone to said fiber reinforcement sheet; curing said fiber reinforcement sheet with applied silicone to create a fiber reinforced silicone sheet which is impervious to fluid; cutting said fiber reinforced silicone sheet in a rectilinear pattern to cover a majority of the cooktop based on known dimensions of the cooktop; printing said fiber reinforced silicone sheet with an ink of a first color.

In certain aspects the cutting step includes cutting a window within a perimeter defined by the rectilinear pattern. In other aspects the method includes providing a clear silicone sheet and aligning said clear silicone sheet with the window and securing said clear silicone sheet to the fiber reinforced silicone sheet. In other aspects the method includes providing a raised edge piece of silicone and securing said raised edge piece of silicone around a perimeter of the rectilinear pattern and providing a second raised edge piece of silicone and securing said second raised edge piece of silicone around the window such that the second raised edge piece of silicone overlaps both the clear silicone sheet and the fiber reinforced silicone sheet. In certain aspects the fiber reinforcement sheet has a weight of at least 100 grams per square meter. In other aspects the fiber reinforcement sheet is fiberglass. In other aspects the fiber reinforcement sheet is of a thickness between 0.1 mm and 2 mm. In other aspects the fiber reinforcement sheet is of a thickness between 0.3 mm and 0.7 mm. In still other aspects upon completion of the manufacturing of the pad, the pad excludes metallic materials. In still other aspects a thickness of said fiber reinforced silicone sheet is 0.5-4 mm. In still other aspects a thickness of said fiber reinforced silicone sheet is 0.5-1.5 mm. In still other aspects the method includes printing said fiber reinforced silicone sheet with an ink of a second color in at least two circular patterns both of which are of a diameter of at least 10 cm.

Other objects are achieved by providing a pad for protecting an induction cook-top which includes a fiber reinforced silicone rubber material wherein the fiber reinforcement is of a weight of at least 100 grams per square meter. The pad has a thickness over a majority of the pad's surface area which between 0.5 and 4 millimeters thick wherein the pad is flexible and is impervious to fluid. The pad has sufficient surface tack to inhibit objects from sliding off the pad and the pad does not include metallic materials.

In certain aspects the fiber reinforcement sheet is fiberglass. In other aspects the fiber reinforcement sheet is of a thickness between 0.1 mm and 2 mm. In still other aspects the fiber reinforcement sheet is of a thickness between 0.3 mm and 0.7 mm. In yet other aspects the pad includes an opening for user access to cook-top controls. In still other aspects, the opening is a cutout which extends inwards with respect to two adjacent peripheral edges such that the cutout creates a narrowed section of the pad between two wider sections of the pad. In yet other aspects the opening is a window within a perimeter of the pad and the window includes silicone rubber material there across such that the window does not include the fiber reinforcement material therein and such that the window is translucent. In still other aspects the window is transparent. In still other aspects the window is thin enough to allow manipulation of capacitive touch controls through the window. In certain aspects said fiber reinforced silicone sheet is cut in a rectilinear pattern and printed with an ink of a first color and the silicone has been cured.

In another aspect a method of protecting a cook-top is provided including: providing a pad including a fiber reinforced silicone rubber material wherein the fiber reinforcement is of a weight of at least 100 grams per square meter, the pad having a thickness over a majority of the pad's surface area which between 0.5 and 4 millimeters thick wherein the pad is flexible and impervious to fluid and has sufficient surface tack to inhibit objects from sliding off the pad, the pad configured to be placed on the cook-top between the cooktop and a cooking vessel. The pad causes no more than a 10 second delay in heat transfer from the cooking vessel across the pad for reading a temperature of the cooking vessel based on a surface temperature of a surface of the pad which is configured to contact the cook-top. The pad the pad does not include metallic materials.

In certain aspects the pad is rectilinear in shape. In other aspects the pad includes an opening for user access to cook-top controls. In other aspects the opening is a cutout which extends inwards with respect to two adjacent peripheral edges such that the cutout creates a narrowed section of the pad between two wider sections of the pad. In further aspects, the opening is a window within a perimeter of the pad and the window includes silicone rubber material there across such that the window does not include the fiber reinforcement material therein and such that the window is translucent. In other aspects, the window is transparent. In still other aspects the silicone rubber material of window is of a thickness small enough such that touch sensitive controls, such as capacitive touch controls, for the cook-top can be controlled through the window. In certain aspects a raised portion of silicone rubber material is around an outer periphery of the pad which is of a different color than the fiber reinforced silicone rubber material. In certain aspects the raised portion is of a height of 2-10 millimeters above the adjacent fiber reinforced silicone material. In certain aspects the fiber reinforced silicone rubber material is of a first color over a majority of its surface area and a portion of the fiber reinforced rubber material includes a second color configured as a ring to represent a cooking zone of the cook-top. In other aspects the pad includes a plurality of rings of the second color to represent different cooking zones of the cook-top. In still other aspects the pad is rectilinear with rounded corners. In still other aspects the pad has a substantially uniform thickness. In yet other aspects, the plurality of rings include at least three rings. In still other aspects the pad causes substantially no reduction in the heat generated in the cooking vessel by the oscillating magnetic field of a cooktop. In still other aspects the pad is removable from the cook-top. In yet other aspects the pad exhibits substantially no deformation of shape when exposed to temperatures between 150-500° F. In certain aspects, the pad remains flat when exposed to temperatures between 150-500° F., particularly, on a cooktop. In still other aspects the opening is a through opening within a perimeter of the pad. In yet other aspects a raised portion of silicone rubber material is around an outer periphery of the pad. In yet other aspects a second raised portion of silicone rubber material is around the through opening. In still other aspects the fiber reinforcement is PTFE coated fiberglass.

Other objects of the invention and its particular features and advantages will become more apparent from consideration of the following drawings, claims and accompanying detailed description. It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions or combinations of functions described herein.

BRIEF DESCRIPTION OF THE DRAWINGS

FIG. 1 is a representation of a manufacturing process for creating the fiber reinforced silicone substrate used in the present invention.

FIG. 2A shows the cutting process

FIG. 2B shows the substrate after cutting according to FIG. 2A

FIG. 2C shows additional features added to the substrate of FIG. 2B.

FIG. 2D shows the additional features of FIG. 2C added.

FIG. 4 is a side view of FIG. 3.

FIG. 5 is a detail view of FIGS. 3 and 4.

FIG. 6 is a perspective view of the pad according to FIG. 3-5 which may be manufactured using some or all of the steps of FIGS. 1 and 2A-E.

FIG. 9 is a top view of a pad which may be manufactured according to some of the steps of FIGS. 1 and 2A-E.

FIG. 10 is a perspective view of the pad of FIG. 9.

FIG. 11 is a perspective view of a pad which may be manufactured according to some of the steps of FIGS. 1 and 2A-E.

FIG. 12 is a top view of the pad of FIG. 11.

DETAILED DESCRIPTION OF THE INVENTION

Figure 3:
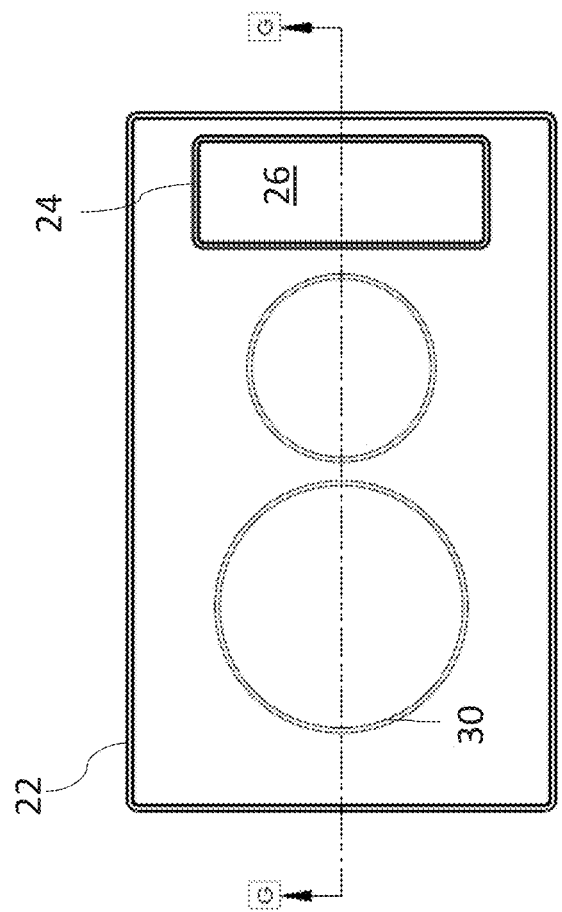
FIG. 3 is a top view of a pad according to the present invention.

Referring now to the drawings, wherein like reference numerals designate corresponding structure throughout the views. The following examples are presented to further illustrate and explain the present invention and should not be taken as limiting in any regard.

As shown in FIG. 1 the pad is made by providing a fiber reinforcement material 4 such as fiberglass, Kevlar, carbon fiber, hybrids thereof or other appropriate fiber reinforcement. In preferred embodiments, PTFE coated fiberglass in a weave pattern with 0 deg and 90 deg woven fibers is provided. Rollers 2 rotate 10 and are coated with silicone. When the fiberglass 4 is rolled through the rollers 2, it becomes impregnated fiberglass 6 which is then printed 8 and cured 9. In some cases, curing is done in a hydraulic press and curing may happen prior to (and/or after) printing. The end result is substrate 12 (FIG. 2A) which is a sheet which is made of a silicone/fiberglass composite material. It is understood that the substrate can first be cured as to the silicone applied by rollers 2 and then printed and then the printed ink cured. Typically the printing is accomplished using silk screening.

Next, the substrate 12 is cut along lines 14 (optionally 16) to create cut substrate 18 (FIG. 2B). Cut line 16 represents a cutout or window or control window for access to cooktop controls. In some embodiments a stamping press is used to make cuts 14,16. Line 14 is sized to cover a majority of a cooktop of a known size, specifically, the size of the cooktop can vary and accordingly the cut pattern will vary to match. Most cooktops have a flat glass surface and the cut pattern/line 14 will typically be sized to be the same shape as the glass (or the exposed part thereof) or slightly smaller. Silicone raised edges 22 (optionally 24) are molded in the appropriate shape to fit around the perimeter of cut substrate 18 and also may be printed or otherwise tinted to the desired color. Optionally, raised edges 22/24 are of a different color silicone than the silicone used with rollers 2. Black is shown with grey silicone for the majority of the remainder of the mat, but as shown herein, preferred embodiments utilize black silicone for the majority of the mat (with rollers 2) and grey or a lighter color silicone for the raised edges 22/24. It is understood that the color may be achieved through printing with a silicone compatible ink or through tinting the silicone. It is understood that some or all of raised edges 22/24 and window 26 are absent fiberglass or fiber reinforcement materials. Outline 14/16 although shown rectilinear can be of any appropriate shape sized to a known cooktop dimension, for example, circular, oval, elliptical and other shapes can be used as may be appropriate for the given application and cooktop to which the pad/mat is designed to work with. The raised edges 22/24 can likewise be shaped to match the cutline 14/16 in their general pattern.

The raised edges 22/24 are glued to cut substrate 18, and in preferred embodiments an RTV (room temperature vulcanizing) glue is used.

When raised edge 24 is glued around opening 20, it is positioned such that the outer perimeter of the silicone of raised edge 24 overlaps the fiberglass composite material and the inner perimeter overlaps clear silicone 26. Accordingly, raised edge 24 is used as a bridge between the fiberglass/silicone material and the dear silicone material with the glue bonding the fiberglass/silicone composite to the raised edge and the raised edge to the dear silicone 26. In preferred embodiments, the dear silicone 26 is of the same or smaller thickness as compared to the cut substrate 18 (fiberglass/silicone composite). In preferred embodiments, a paper covering is applied to the clear silicone 26 on both sides in a temporary bonding so as to protect the clear silicone 26 during transport.

Figure 2E:
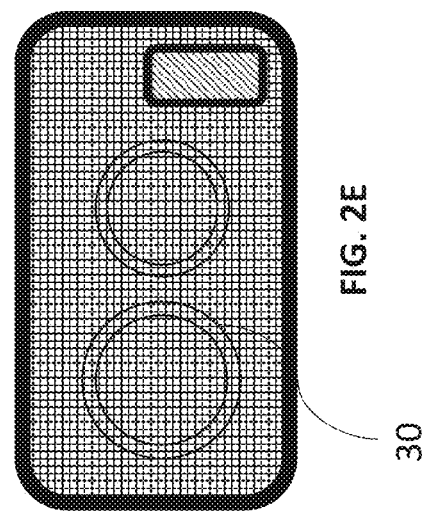
FIG. 2E shows FIG. 2D with added printing.

As shown in FIG. 2E, printing of cooking zones 30 can be added in appropriate locations. FIG. 3 shows a mat similar to FIG. 2E but without the shading provided which shows the fiberglass material. The printing 8 shown in FIG. 1 can also include printing cooking zones 30 in addition to printing the majority of the pad area. As shown in FIG. 6, the majority of the pad area is black with the raised edges 22/24 and cooktop zones 30 being grey in color.

FIG. 5 shows exemplary dimensions in the preferred embodiment. As can be seen, the control window 26 and the fiberglass 4 impregnated material are the same thickness (0.030 inches). Although this specific dimension is shown, the preferred range is 0.5-4 mm, more preferably 0.5-1.5 mm. In preferred embodiments, the fiber reinforcement 4 is of a thickness in the rage of 0.1-2 mm and more preferably 0.3-0.7 mm. As shown, the raised edges 22/24 are within the same ranges described with respect to the window 26 and fiberglass/silicone composite. Specifically, the preferred embodiment has a thickness of 0.030 inches for the raised edge 22/24 (for a combined thickness of 0.060 inches. It is understood that the raised edge can up to roughly double the thickness in the perimeter areas. It is understood that certain variances can be found due to temperatures in that the pad will encounter a range of temperatures roughly in the 150-500 deg range when in use and roughly 70-75 degrees (approx. room temperature). It is also understood that variances can occur due to the fact that glues are typically used to attach the edges 22/24 and thus can increase thicknesses slightly depending on how thick the glue layer is.

The thickness of the pad has been determined to be important to proper operation of the pad in connection with induction stoves. Specifically, the pad is relatively thin compared to prior art pads because the thicker pads will impede heat transfer from the vessel to the temperature sensor of the induction stove which infers temperature of the pad. If the pad is too thick, it may take an undesirably long amount of time for the heat of the vessel to transfer through the pad. Silicone is often considered to be an insulating material, so use of silicone to allow heat transfer is counterintuitive. Preferred embodiments of the present invention are provided without use of metallic materials which are often considered better thermal conductors. Thus, the heat transfer in the present invention is achieved using materials which are often not considered to be thermally conductive, however the acceptable conduction level is achieved by use of a very thin pad. In preferred embodiments, the thickness of the pad allows for heat transfer through the pad of less than 10 second delay in temperature, more particularly less than a 5 second delay and even more particularly less than a 2.5 second delay. In this manner, the temperature reading of the cooktop sensor is sufficiently close to the actual pan temperature such that the induction stove coils can be controlled appropriately.

However, making the pad thinner comes with challenges too. Specifically, if just silicone is used for a very thin pad, it can be easy to damage or break or tear. Thus the fiber reinforcement is used to strengthen the silicone and resist tearing. The thickness of the fiber reinforcement is also important to allow sufficient heat transfer and avoid excessive temperature transfer delays to cause faulty readings of the temperature sensor (or incorrect inferences). For example, fiberglass is also considered generally to be an insulating material (aramid/Kevlar and carbon fiber can too). Thus, use of a sufficiently thin fiberglass and a sufficiently thin end fiberglass/silicone composite employs two materials generally considered to be insulators in a situation where heat transfer is desirable.

As can be seen in FIG. 5, the edges 22/24 are provided with tapered and/or rounded edges with a base (gluing surface) width of 0.25 inches and a top surface of 0.129 inches. These values can be in ranges of +/−30% or more preferably +/−20% or even more preferably +/−10% from the stated value on the figures. This variance applies to all dimensions shown on the figures (which are in inches).

As shown in FIG. 6, the majority of the mat is black, with grey rings to designate cooking zones and grey raised edges 22/24. The dear window 26 is provided to allow for manipulation of touch sensitive controls. In preferred embodiments, the window 26 is thin enough to allow use of capacitive touch sensitive controls through the window 26. The printing of the cooking zones are also matched to the same known cooktop that cut lines 14/16 are based. Accordingly, the mat can be laid on the glass cooktop and it will tend to blend in with the glass and will still provide designation of cooking zones and access to cooktop controls.

Figure 8:
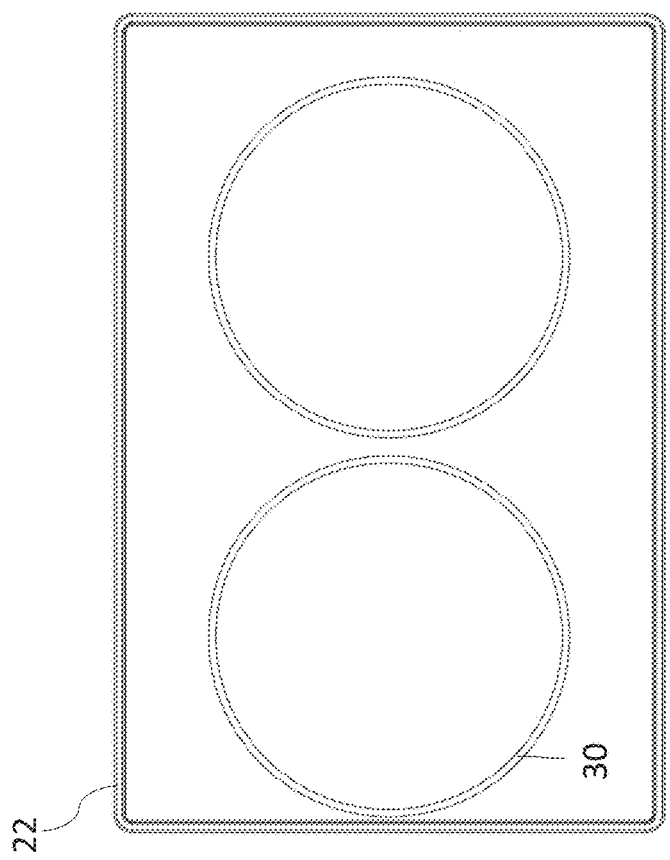
FIG. 8 is a top view of FIG. 7.
Figure 7:
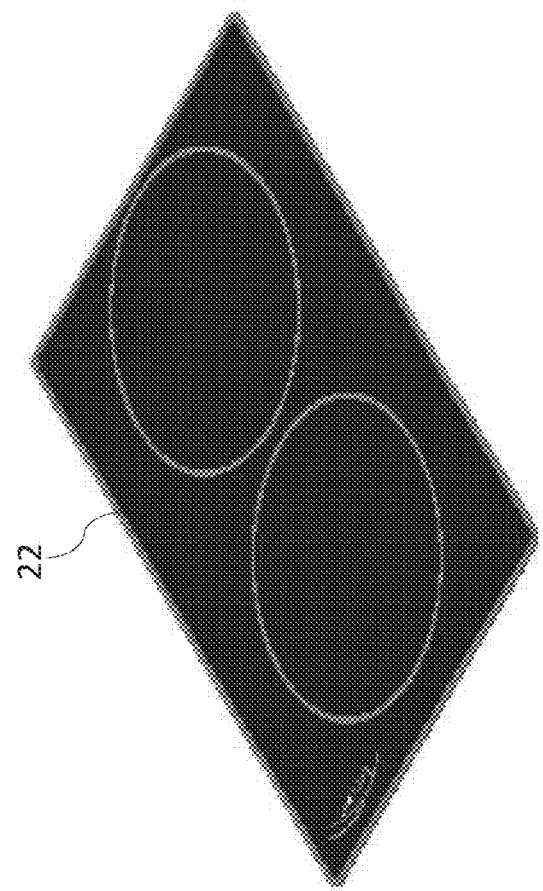
FIG. 7 is a perspective view of a pad which may be manufactured according to some of the steps of FIGS. 1 and 2A-E.

FIG. 7-8 shows a pad with raised borders 22 and two cooking zones 30 delineated via printing.

FIG. 9-10 shows another example of a rectilinear cut pattern with rectilinear cutout 20' which is removes a portion of the perimeter zone to create a staggered edge 36 at a first section of the pad. The staggered edge 36 is inwards with respect to adjacent portions/sections 32/34 and their edges 38/40. Two zones 30 are delineated via printing and edge 22 is shaped to fit the cutout 20' and the basic perimeter of the resulting mat. FIG. 11-12 shows a mat without a cutout but four printed zones 30 and raised edge 22. It is also contemplated that the raised edge 22 can be excluded from any of the mats provided herein. In mats shown with a clear silicone window 26, embodiments with the absence of edge 24 will typically mean that the clear window 26 is not used and only a cutout 20 is provided. However, it is also contemplated that the clear window 26 can be bonded directly to the fiberglass/silicone composite material, preferably on the bottom surface (which will contact the cooktop). Cutout 20' is used for situations where the controls are knobs or others which are substantially raised and thus the cutout 20' a s those controls to be unimpeded and not covered by the pad.

FIG. 11-12 shows a cooktop mat with raised edge 22 and four printed zones 30. In preferred embodiments, each of the zones is provided with a circular printing with a diameter of at least 10 cm, optionally, the printing of each zone can designate a zone which is of an area at least 78.5 cm^2. Preferably, the zone is of a different color than the majority of the pad and most preferably, the majority of the pad is a dark color whereas the printed zones (and/or the raised edges) are of a light color of sufficient contrast to be visually separable. More preferably, the diameter of the circular printing for each circle is at least 15 cm (or the corresponding area equivalent).

It should be noted that, while various functions and methods have been described and presented in a sequence of steps, the sequence has been provided merely as an illustration of one advantageous embodiment, and that it is not necessary to perform these functions in the specific order illustrated. It is further contemplated that any of these steps may be moved and/or combined relative to any of the other steps. In addition, it is still further contemplated that it may be advantageous, depending upon the application, to utilize all or any portion of the functions described herein.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A pad for protecting an induction cook-top with at least two cooking zones, the pad comprising:
   a fiber reinforced silicone rubber material made from silicone rubber and a fiber reinforcement;
   the fiber reinforcement is of a weight of at least 100 grams per square meter;
   the fiber reinforced silicone rubber material has a thickness over a majority of the pad's surface area which is between 0.5 and 4 millimeters thick and the pad is flexible and impervious to fluid within a perimeter of the pad;
   the pad is configured to lay flat on and to cover the at least two cooking zones and the pad has two surfaces respectively on first and second sides of the pad are comprised of the silicone rubber material and the silicone rubber material on the two surfaces provides surface tack which inhibits pots, pans or pots and pans from sliding off the first surface of the pad and which inhibits the second surface of the pad from sliding off the induction cook-top the pad is placed on and wherein the pad is configured to be removable from the induction cook-top the pad is placed on and the pots, pans or pots and pans are removable from the pad;
   wherein the pad does not include metallic materials.

2. The pad of claim 1 wherein the fiber reinforcement is fiberglass.

3. The pad of claim 1 wherein the fiber reinforcement is of a thickness between 0.1 mm and 2 mm.

4. The pad of claim 1 wherein the fiber reinforcement is of a thickness between 0.3 mm and 0.7 mm.

5. The pad of claim 1 wherein the pad includes an opening for user access to cook-top controls and the opening is a cutout which extends inwards with respect to two adjacent peripheral edges such that the cutout creates a first section of the pad between two second sections of the pad, the first section narrower than each of the two second sections and the each of the second sections having a width measured across the respective second section along, a width of the first section is wider than the width of one or more of the two second sections.

6. The pad of claim 1 wherein said fiber reinforced silicone rubber material is cut in a rectilinear pattern and printed with an ink of a first color.

7. A pad for protecting an induction cook-top comprising:
   a fiber reinforced silicone rubber material made from silicone rubber and a fiber reinforcement;
   the fiber reinforcement is of a weight of at least 100 grams per square meter;
   the fiber reinforced silicone rubber material has a thickness over a majority of the pad's surface area which is between 0.5 and 4 millimeters thick and the pad is flexible and impervious to fluid;
   the pad has two surfaces respectively on first and second sides of the pad which are comprised of the silicone rubber material and the silicone rubber material on the two surfaces provides surface tack which inhibits pots, pans or pots and pans from sliding off the first surface of the pad and which inhibits the second surface of the pad from sliding off the induction cooktop the pad is placed on when the pad is placed flat on the induction cooktop with the pad removable from the cook-top;
wherein the pad does not include metallic materials and wherein the pad includes an opening for user access to cook-top controls and the opening is a window within a perimeter of the pad and the window includes translucent silicone rubber material covering the opening and the translucent silicone rubber material does not include the fiber reinforcement material therein.

8. The pad of claim 7 wherein the window is transparent.

9. The pad of claim 7 wherein the window is thin to allow manipulation of capacitive touch controls through the window.

10. The pad of claim 7 wherein the pots, pans or pots and pans are removable from the pad.

* * * * *